(12) United States Patent
Yoshida et al.

(10) Patent No.: US 10,144,281 B2
(45) Date of Patent: Dec. 4, 2018

(54) HYDRAULIC CONTROL DEVICE AND METHOD FOR VEHICLE

(71) Applicant: HONDA MOTOR CO., LTD., Tokyo (JP)

(72) Inventors: Yuma Yoshida, Wako (JP); Noriyasu Hakuta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/542,808

(22) PCT Filed: Mar. 8, 2016

(86) PCT No.: PCT/JP2016/057058
§ 371 (c)(1),
(2) Date: Jul. 11, 2017

(87) PCT Pub. No.: WO2016/143762
PCT Pub. Date: Sep. 15, 2016

(65) Prior Publication Data
US 2018/0009315 A1 Jan. 11, 2018

(30) Foreign Application Priority Data

Mar. 9, 2015 (JP) ................................. 2015-046102

(51) Int. Cl.
*B60K 17/348* (2006.01)
*F16D 48/02* (2006.01)
(Continued)

(52) U.S. Cl.
CPC ............ *B60K 17/348* (2013.01); *B60K 17/35* (2013.01); *B60K 23/0808* (2013.01);
(Continued)

(58) Field of Classification Search
CPC ............ B60K 17/348; F16D 48/02; F16D 2500/10431; F16D 2500/3024;
(Continued)

(56) References Cited

U.S. PATENT DOCUMENTS 4,821,188 A * 4/1989 Ikemoto ............. B60G 17/0162
280/5.51
5,394,694 A * 3/1995 Doumov ................. F16H 41/22
416/197 C
(Continued)

FOREIGN PATENT DOCUMENTS

JP 2004-301209 A 10/2004
JP 2012-92933 A 5/2012
(Continued)

OTHER PUBLICATIONS

International Search Report dated Jun. 14, 2016, issued in counterpart International Application No. PCT/JP2016/057058 (2 pages).
(Continued)

Primary Examiner — Jacob S. Scott
Assistant Examiner — Tinh Dang
(74) Attorney, Agent, or Firm — Westerman, Hattori, Daniels & Adrian, LLP (57) ABSTRACT

A hydraulic control device for a vehicle is provided wherein a determination of "base neutral" is made when a difference between a command hydraulic pressure and an actual hydraulic pressure of a hydraulic clutch is within a predetermined minute value range, and when the difference is out of the minute value range, a determination of "base raising" is made if the command hydraulic pressure is larger than the actual hydraulic pressure, and a determination of "base lowering" is made if the command hydraulic pressure is smaller than the actual hydraulic pressure. The determination of "sub raising" is made when an inclination of com-
(Continued)

mand torque subjected to low-pass filter processing is positive for a predetermined time or more, and the determination of "sub lowering" is made when the inclination is negative for the predetermined time or more, whereby a rising or dropping tendency of the command torque is determined.

3 Claims, 5 Drawing Sheets

(51) Int. Cl.
   *B60K 17/35* (2006.01)
   *B60K 23/08* (2006.01)
   *F16H 63/46* (2006.01)

(52) U.S. Cl.
   CPC ...... *F16D 48/02* (2013.01); *B60K 2023/0816* (2013.01); *B60K 2023/0858* (2013.01); *F16D 2500/10431* (2013.01); *F16D 2500/3024* (2013.01); *F16D 2500/7044* (2013.01); *F16D 2500/70406* (2013.01); *F16D 2500/7109* (2013.01); *F16H 63/46* (2013.01)

(58) Field of Classification Search
   CPC ... F16D 2500/70406; F16D 2500/7044; F16D 2500/7109
   See application file for complete search history.

(56) References Cited

U.S. PATENT DOCUMENTS

| | | | |
|---|---|---|---|
| 5,927,425 A * | 7/1999 | Kusano | B60K 23/0808 180/248 |
| 2010/0161191 A1* | 6/2010 | Kato | B60T 8/442 701/70 |
| 2012/0109385 A1* | 5/2012 | Morita | F15B 19/002 700/281 |
| 2014/0020374 A1* | 1/2014 | Sugo | B60K 17/348 60/431 |
| 2014/0324309 A1 | 10/2014 | Karpenman et al. | |
| 2016/0084724 A1* | 3/2016 | Shibata | F04B 49/065 417/22 |

FOREIGN PATENT DOCUMENTS

| | | |
|---|---|---|
| JP | 2014-503770 A | 2/2014 |
| JP | 5607240 B2 | 10/2014 |
| WO | 2012/141128 A1 | 10/2012 |

OTHER PUBLICATIONS

Notice of Reasons for Rejection dated Dec. 6, 2016, issued in counterpart Japanese Patent Application No. 2016-552642, w/English translation (4 pages).

Decision to Grant a Patent dated Apr. 11, 2017, issued in counterpart Japanese Patent Application No. 2016-552642, w/English translation (6 pages).

* cited by examiner

HYDRAULIC CONTROL DEVICE AND METHOD FOR VEHICLE

TECHNICAL FIELD

The present invention relates to hydraulic control device and method for a vehicle, and particularly, relates to hydraulic control device and method, which perform control that considers hysteresis characteristics at a time of pressurizing a hydraulic clutch and time of depressurizing the hydraulic clutch.

BACKGROUND ART

Patent Literature 1 describes a technology, in which, in a hydraulic control device, full hysteresis characteristics which represent hysteresis to hydraulic pressure change characteristics composed of pressurization characteristics and depressurization characteristics are provided as a reference map, and when minor loops, which are turned back at midway positions within a range of the hydraulic change characteristics, go on, a plurality of reduced maps, which are obtained by reducing the reference map in response to turning-back positions, are created for each of such minor loops from the past to the present point of time, and a hysteresis hydraulic pressure correction amount is arithmetically operated by a sum of respective hysteresis hydraulic correction amounts obtained by the plurality of reduced maps at the same indicated current position. In such a configuration, the hydraulic control can be performed in accordance with highly accurate hysteresis characteristics; however, there is a problem that an enormous calculation resource is required.

Patent Literature 2 describes a technology, in which, in a torque transmission system using a hydraulic clutch for controlling driving force distributed to front/rear wheels of a vehicle, hystereses at a pressurization time and a depressurization time are simply estimated by using a pressurization side hydraulic pressure—torque characteristic table and a depressurization side hydraulic pressure—torque characteristic table, and based on the estimated hystereses, a command hydraulic pressure is calculated in accordance with characteristics which differ between the pressurization time and the depressurization time. Here, which of the tables is to be used is decided by determining whether or not there is a request to fasten the clutch or a request to increase fastening force thereof (pressurization request) or a request to release the fastening or a request to reduce the fastening force based on the driving force (command torque) distributed to the front/rear wheels in response to a running state of the vehicle. Such a configuration can be made simple; however, switching of the hysteresis characteristics between the pressurization time and the depressurization time is performed only based on such required driving force (command torque), and accordingly, sufficient accuracy cannot be obtained.

PRIOR ART LITERATURES

Patent Literatures

Patent Literature 1: Japanese Patent Laid-Open Publication No. 2012-92933
Patent Literature 2: Japanese Patent No. 5607240

DISCLOSURE OF THE INVENTION

The present invention has been made in consideration of the above-mentioned points. It is an object of the present invention to provide hydraulic control device and method, which are made capable of performing pressurization-time and depressurization-time hysteresis control with high accuracy though configurations thereof are simple.

The present invention is a hydraulic control device for a vehicle, the hydraulic control device performing control to decide a command hydraulic pressure, which corresponds to command torque, based on predetermined torque hysteresis characteristics, and to supply a hydraulic pressure, which corresponds to the command hydraulic pressure, to a hydraulic clutch, the hydraulic control device comprising: a base determination unit that makes a determination of base neutral when a difference between the command hydraulic pressure and an actual hydraulic pressure of the hydraulic clutch is within a predetermined minute value range, and when the difference is out of the minute value range, makes a determination of base raising if the command hydraulic pressure is larger than the actual hydraulic pressure, and makes a determination of base lowering when the command hydraulic pressure is smaller than the actual hydraulic pressure; a sub determination unit that performs low-pass filter processing for the command torque, makes a determination of sub raising when an inclination of the command torque subjected to the low-pass filter processing is positive for a predetermined time or more, and makes a determination of sub lowering when the inclination is negative for the predetermined time or more; and a characteristic decision unit that decides the command hydraulic pressure by using pressurization characteristics in the torque hysteresis characteristics when the determination of the base raising is made, decides the command hydraulic pressure by using depressurization characteristics in the torque hysteresis characteristics when the determination of the base lowering is made, and when the determination of the base neutral is made, decides the command hydraulic pressure by using the pressurization characteristics in the torque hysteresis characteristics if the sub determination unit makes the determination of the sub raising, and decides the command hydraulic pressure by using the depressurization characteristics in the torque hysteresis characteristics if the sub determination unit makes the determination of the sub lowering.

In accordance with the present invention, as a basic control, which of the pressurization characteristics and the depressurization characteristics in the predetermined torque hysteresis characteristics is to be used is determined (selected) based on a magnitude relationship between the command hydraulic pressure and the actual hydraulic pressure. Accordingly, such selection of the pressurization characteristics and the depressurization characteristics, the selection accurately reflecting an actual pressurization or depressurization state in the hydraulic clutch, can be performed. As a result, torque accuracy can be enhanced though such a simple configuration is adopted. Moreover, the determination of "base neutral" is made when the difference between the command hydraulic pressure and the actual hydraulic pressure is within the range of the predetermined minute value. Then, which of the pressurization characteristics and the depressurization characteristics in the torque hysteresis characteristics is to be used is determined (selected) not by the above-described selection that is based on the magnitude relationship between the command hydraulic pressure and the actual hydraulic pressure, but based on the long-time tendency of the change of the command torque, which is determined by the sub determination unit. Accordingly, the hysteresis curve selecting operation is caused not to respond to such a hunting phenomenon that the magnitude relationship between the command hydraulic pressure and the actual hydraulic pressure repeats the inversion within the minute value range. Therefore, also by this fact, the torque accuracy can be enhanced.

BEST MODE FOR CARRYING OUT THE INVENTION

Figure 1:
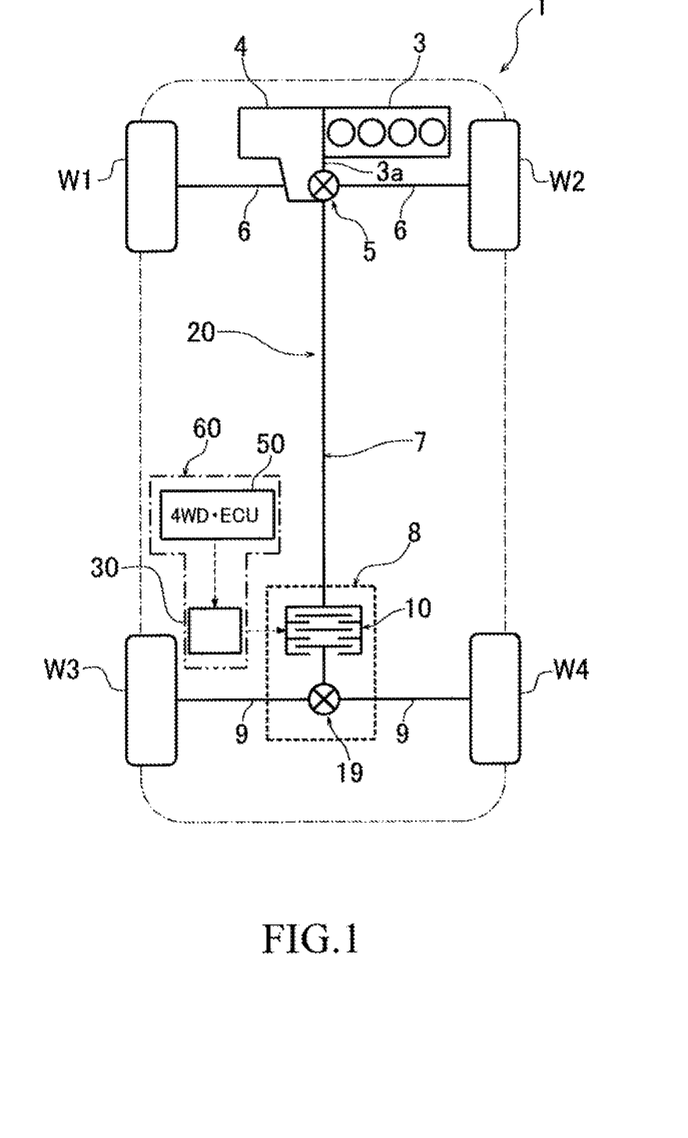
FIG. 1 is a diagram showing a schematic configuration of a four-wheel-drive vehicle including a hydraulic control device according to an embodiment of the present invention.

FIG. 1 is a diagram showing a schematic configuration of a four-wheel-drive vehicle including a hydraulic control device according to an embodiment of the present invention. A four-wheel-drive vehicle 1 shown in FIG. 1 includes: an engine (a driving source) 3 transversely mounted in a front portion of the vehicle; an automatic transmission 4 placed integrally with the engine 3; and a driving force transmission path 20 for transmitting driving force, which comes from the engine 3, to front wheels W1 and W2 and rear wheels W3 and W4.

An output shaft (not shown) of the engine 3 is coupled to the left and right front wheels W1 and W2, which are main drive wheels, via the automatic transmission 4, a front differential 5 and left and right drive shafts 6 and 6. Moreover, the output shaft of the engine 3 is coupled to the left and right, rear wheels W3 and W4, which are sub drive wheels, via the automatic transmission 4, the front differential 5, a propeller shaft 7, a rear differential unit 8 and left, and rear drive shafts 9 and 9.

In the rear differential unit 8, there are provided: a rear differential 19 for distributing the driving force to the left and right rear drive shafts 9 and 9; a front/rear torque distributing clutch 10 for connecting/disconnecting the driving force transmission path from the propeller shaft 7 to the rear differential 19. The front/rear torque distributing clutch 10 is a hydraulic clutch, and is a driving force distribution device for controlling the driving force distributed to the rear wheels W3 and W4 in the driving force transmission path 20. Moreover, the four-wheel-drive vehicle 1 includes: a hydraulic circuit 30 for supplying hydraulic oil to the front/rear torque distributing clutch 10; and a 4WD·ECU (hereinafter, simply referred to as "ECU") 50 that is a control device for controlling a pressure of oil supplied by the hydraulic circuit 30. ECU 50 is composed of a microcomputer or the like, and includes: a storage device that stores therein an instruction, group relating to a required computer program; a processor capable of executing the instruction group; and the like.

ECU 50 controls the pressure of the oil supplied by the hydraulic circuit 30, and thereby controls the driving force distributed to the rear wheels W3 and W4 by the front/rear torque distributing hydraulic clutch (hereinafter, simply referred to as "clutch") 10. In this way, there is performed drive control, in which the front wheels W1 and W2 serve as the main drive wheels, and the rear wheels W3 and W4 serve as the sub drive wheels.

That is, when the clutch 10 is released (disconnected), rotation of the propeller shaft 7 is not transmitted to the rear differential 19 side, and torque of the engine 3 is entirely transmitted to the front wheels W1 and W2, whereby a front wheel drive (2WD) state is established. Meanwhile, when the clutch 10 is connected, the rotation of the propeller shaft 7 is transmitted to the rear differential 19 side, whereby the torque of the engine 3 is distributed to both of the front wheels W1 and W2 and the rear wheels W3 and W4, and a four wheel drive (4WD) state is established. The ECU 50 arithmetically operates the driving force distributed to the rear wheels W3 and W4 and a supplied amount of a hydraulic pressure to the clutch 10, the supplied amount corresponding to the distributed driving force, based on detection of a variety of detectors (not shown) for detecting a running state of the vehicle, and in addition, outputs a driving signal, which is based on a result of such an arithmetic operation, to the clutch 10. In this way, fastening force of the clutch 10 is controlled, and the driving force distributed to the rear wheels W3 and W4 is controlled.

Figure 2:
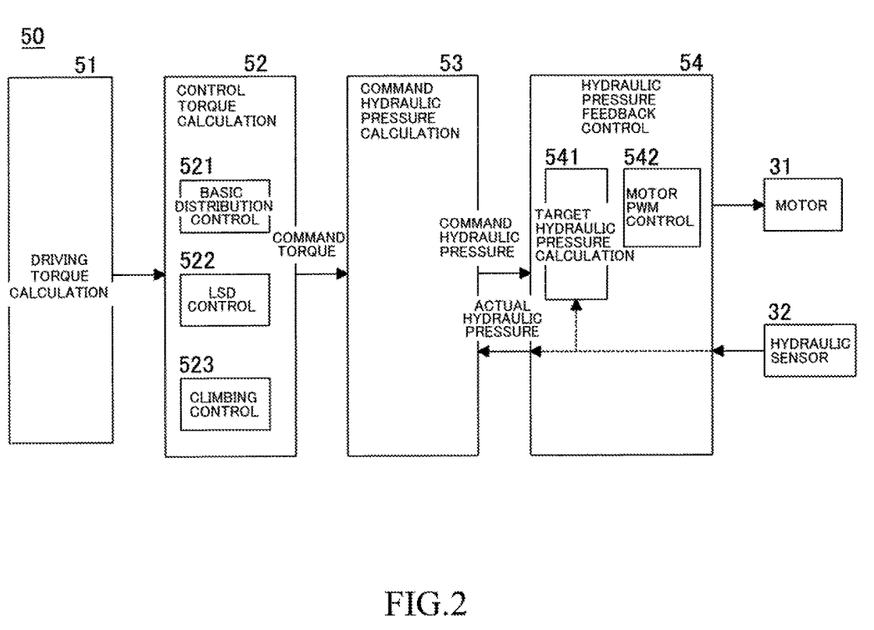
FIG. 2 is a diagram showing main functional blocks of a 4WD·ECU that functions as the hydraulic control device.

FIG. 2 shows main functional blocks in the 4WD·ECU (a control device) 50. In a driving torque calculation block 51, there is calculated driving torque (estimated driving force) required for vehicle 1 in response to running conditions of the vehicle 1 (that is, the torque of the engine 3, a selected gear, a shift position, and the like). In a control torque calculation block 52, by a basic distribution control (basic distribution control for driving force to front/rear wheels W1 to W4) block 521, an LSD control block 522, a climbing control block 523 and the like, the distribution of the above-described driving torque to the front/rear wheels is decided in response to a variety of control factors, and command torque for the front/rear torque distributing clutch (a driving force distribution device) 10 is calculated. In a command hydraulic pressure calculation block 53, a command hydraulic pressure for the clutch 10 is calculated in accordance with the command torque. In a hydraulic pressure feedback control block 54, by a target hydraulic pressure calculation block 541, a target hydraulic pressure (that is, a hydraulic pressure deviation) of the clutch 10 is calculated in accordance with a deviation between the command hydraulic pressure given from the command hydraulic pressure calculation block 53 and an actual hydraulic pressure (a feedback signal coming from a hydraulic sensor 32), and then by a motor PWM control block 542, a motor 31 is controlled in accordance with the calculated target hydraulic pressure (that is, the hydraulic deviation). The motor 31 is an electric motor for driving a hydraulic pump (not shown) for supplying a hydraulic oil pressure to the clutch 10. The hydraulic sensor 32 measures such a pressure of the oil supplied to the clutch 10. In the motor PWM control block 542, a PWM drive command signal for the motor 31 is generated in response to the target hydraulic pressure (that is, the hydraulic deviation). In this way, hydraulic feedback control is performed so that the actual hydraulic pressure can follow the command hydraulic pressure. Mote that, as described in Patent Literature 2 described above (Japanese Patent No. 5607240), such a configuration can also be adopted, in which a solenoid valve (an on/off valve) is provided in the hydraulic circuit for supplying the hydraulic pressure to the clutch 10, then the solenoid valve is opened or closed according to needs, whereby hydraulic pressure sealing control is performed, and a frequency of using the motor 31 is reduced. Here, in the hydraulic pressure sealing control, the motor 31 is intermittently driven to pressurize the clutch 10 in a state in which the solenoid valve is closed, and the solenoid valve is intermittently opened to depressurize the clutch 10 in a state in which the motor 31 is in an OFF state. These functional blocks 51 to 54 may be composed of computer program modules, or alternatively, may be composed of hard wired circuits (integrated circuits or the like) which execute dedicated processing functions. In a case of grasping the present invention as a method implemented by a computer, these functional blocks 51 to 54 and respective pieces of processing executed in insides thereof correspond to steps which constitute the method.

Figure 3:
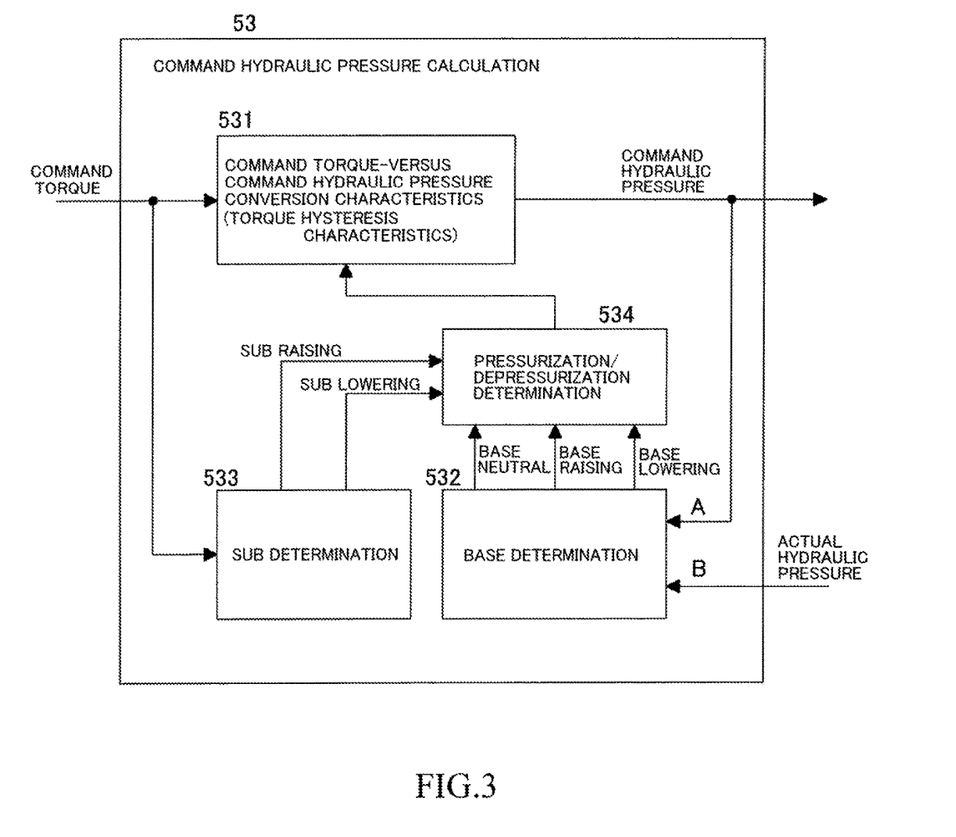
FIG. 3 is a diagram showing an extracted control block related to the present invention.

FIG. 3 is a diagram showing extracted control elements, which are included in the command hydraulic pressure calculation block 53 shown in FIG. 2 and relate to the present invention. A command torque-versos command hydraulic pressure conversion characteristic generation block 531 decides the command hydraulic pressure, which corresponds to the command torque, based on predetermined torque hysteresis characteristics. An example of basic command torque-versus command hydraulic pressure conversion characteristics (torque hysteresis characteristics) generated by this block 531 is composed of a hysteresis curve as shown by a solid line 41 in FIG. 4. The hysteresis curve (torque hysteresis characteristics) 41 is composed of a torque rising-time curve (pressurization characteristics) 41a and a torque dropping-time curve (depressurization characteristics) 41b. The hysteresis curve has such hysteresis characteristics in which, with respect to the same command torque value, a command hydraulic pressure at the torque rising time indicates a larger value than a command hydraulic pressure at the torque dropping time. This is because a hydraulic system has such hysteresis characteristics that, when the torque drops, the torque is less likely to be released even if the command hydraulic pressure is reduced. Which of the torque rising-time curve (pressurization characteristics) 41a and the torque dropping-time curve (depressurization characteristics) 41b is to be used is instructed by a pressurization/depressurization determination block 534 based on determinations of a base determination block 532 and sub determination block 533. Note that, in usual, in an initial state (when stopped), the torque rising-time curve 41a is selected, and the command torque-versus command hydraulic pressure conversion characteristic generation block 531 outputs a signal indicating the command hydraulic pressure, which corresponds to an inputted value of the command torque, by using the torque rising-time curve 41a. This signal indicating the command hydraulic pressure is given to the hydraulic pressure feedback control block 54, and the motor 37 is driven in response to a deviation of the command hydraulic pressure from an actual hydraulic pressure detected by a hydraulic pressure sensor 45, whereby control is performed so as to supply a hydraulic pressure, which corresponds to the command hydraulic pressure, to the hydraulic clutch 10.

The base determination block 532 compares a current command hydraulic pressure and the actual hydraulic pressure, which is detected by the hydraulic pressure sensor 45, with each other, makes a determination of "base neutral" when a difference (D=A−B) between the command hydraulic pressure (A) and the actual command hydraulic pressure (B) is within a predetermined minute value range (±δ) (−δ≤D≤+δ), and when the difference concerned is out of the minute value range, makes a determination of "base raising" if the command hydraulic pressure is larger than the actual hydraulic pressure (+δ<D), and makes a determination of "base lowering" if the command hydraulic pressure is smaller than the actual hydraulic pressure (D<−δ). "Base raising" means that, as a basic determination, it is determined that the command hydraulic pressure tends to rise, "Base lowering" means that, as such a basic determination, it is determined that the command hydraulic pressure tends to drop. "Base neutral" means that, as the basic determination, it is not determined whether the command hydraulic pressure tends to rise or drop. Note that the predetermined minute value range (±δ) is set appropriately within an appropriate value range in order not to cause the hysteresis curve selecting operation to directly respond to such a hunting phenomenon that the difference (D) between the command hydraulic pressure and the actual hydraulic pressure is frequently repeated to be positive and negative.

The sub determination block 533 performs low-pass filter processing for the command torque, makes a determination of "sub raising" when an inclination of the command torque subjected to the low-pass filter processing is positive for a predetermined time or more, and makes a determination of "sub lowering" when the inclination is negative for the predetermined time or more. By the low-pass filter processing, the hysteresis curve becomes a curve, which responds to a slow change of the command torque, and does not respond to a fast change of the command torque, and accordingly, it can be determined whether the command torque tends to rise or drop. That is, when the inclination of the command torque subjected to the low-pass filter processing is positive for the predetermined time or more, the command torque tends to rise, and the determination of "sub raising" is made, which indicates that the command torque tends to rise. On the other hand, when the inclination of the command torque subjected to the low-pass filter processing is negative for the predetermined time or more, the command torque tends to drop, and the determination of "sub lowering" is made, which indicates that the command torque tends to drop.

Figure 4:
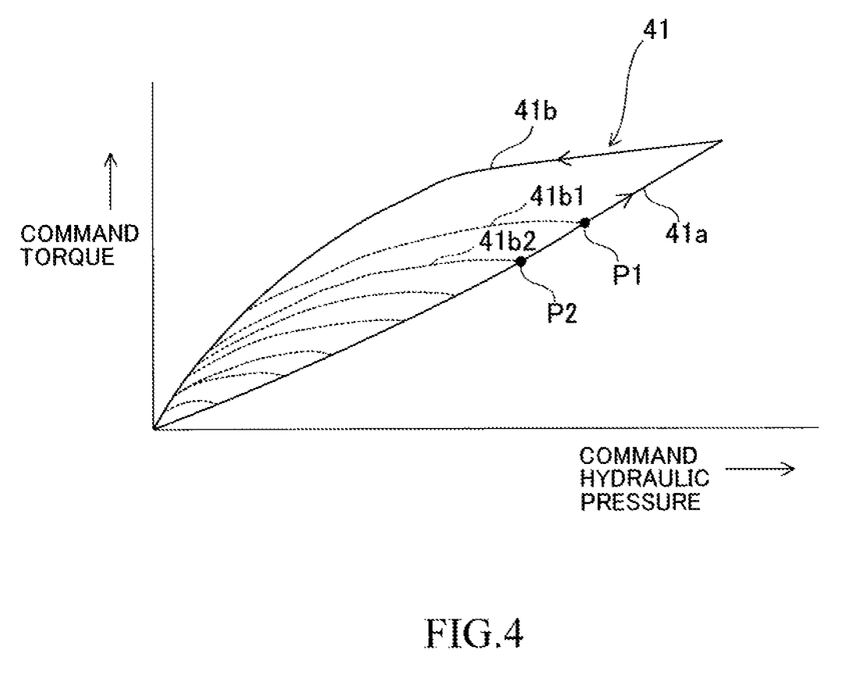
FIG. 4 is a graph showing an example of command torque-versus command hydraulic pressure conversion characteristics (torque hysteresis characteristics) in the embodiment.

The pressurization/depressurization determination block 534:

(1) when the determination of "base raising" is made by the base determination block 532, instructs the command torque-versus command hydraulic pressure conversion characteristic generation block 531 to use the pressurization characteristics (the torque rising-time curve 41a) in the torque hysteresis characteristics;

(2) when the determination of "base lowering" is made by the base determination block 532, instructs the command torque-versus command hydraulic pressure conversion characteristic generation block 531 to use the depressurization characteristics (the torque dropping-time curve 41b) in the torque hysteresis characteristics;

(3) when the determination of "base neutral" is made by the base determination block 532, instructs the command torque-versus command hydraulic pressure conversion characteristic generation block 531 to use the pressurization characteristics (the torque rising-time curve 41a) in the torque hysteresis characteristics if the determination of "sub raising" is made by the sub determination block 533; and (4) when the determination of "base neutral" is made by the base determination block 532 in the same way, however; instructs the command torque-versus command hydraulic pressure conversion characteristic generation block 531 to use the depressurization characteristics (the torque dropping-time curve 41b) in the torque hysteresis characteristics if the determination of "sub lowering" is made by the sub determination block 533.

Figure 5A:
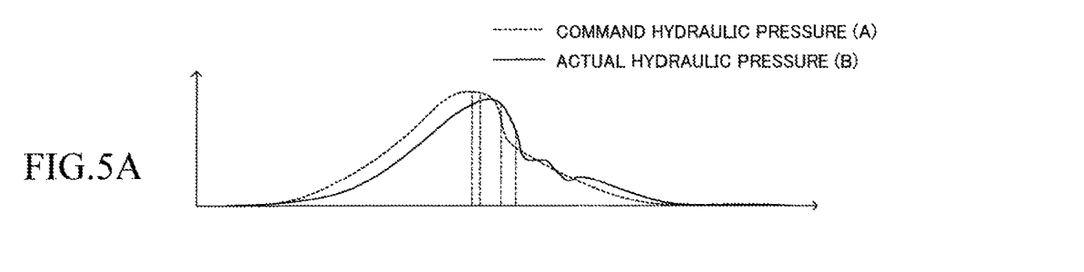
FIG. 5A to FIG. 5D are time charts showing an operation example of pressurization/depressurization determinations in accordance with this embodiment.
Figure 5B:
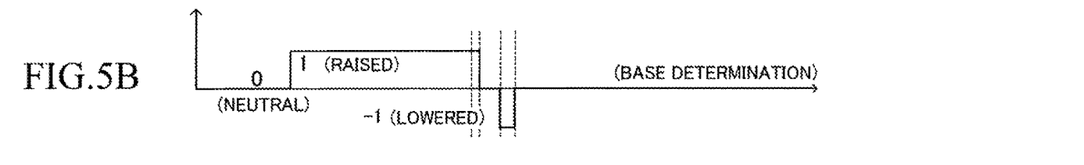
Figure 5C:
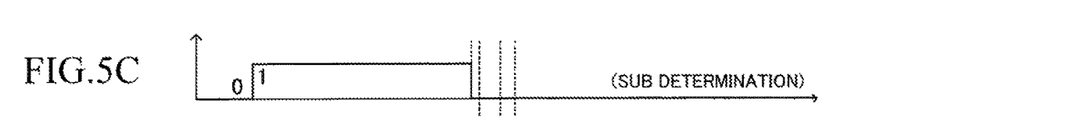
Figure 5D:
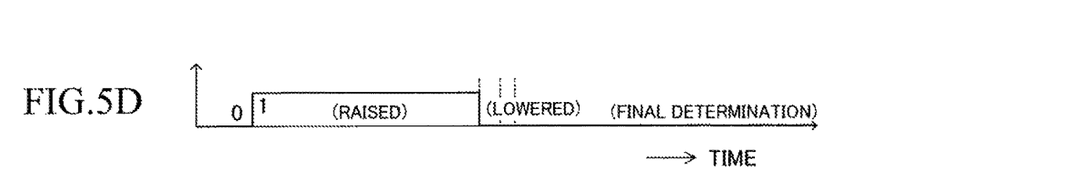

FIG. 5A to FIG. 5D are time charts showing an operation example of the pressurization/depressurization determinations in accordance with this embodiment. FIG. 5A shows an example of temporal changes of the command hydraulic pressure (A: broken line) and the actual hydraulic pressure (B: solid line), and FIG. 5B shows an example of the determination made by the base determination block 532 in response to a relationship between the command hydraulic pressure (A) and the actual hydraulic pressure (B), the relationship being shown in FIG. 5A. In FIG. 5B, 1 indicates the determination of "base raising", 0 indicates the determination of "base neutral", and −1 indicates the determination of "base lowering". In a section where the difference (D=A−B) between the command hydraulic pressure (A) and the actual hydraulic pressure (B) is within the predetermined minute value range (±δ), the determination of "base neutral" (0) is made. For example, the determination of "base neutral" (0) is made when such a magnitude difference between the command hydraulic pressure (A) and the actual hydraulic pressure (B) repeats inversion within the range of the predetermined minute value (causes the hunting phenomenon) in a course where the command hydraulic pressure (A) decreases. FIG. 5C shows an example of the determination made by the sub determination block 533, where 1 indicates the determination of "sub raising", and 0 indicates the determination of "sub lowering". FIG. 5D shows an example of a final pressurization/depressurization determination made by the pressurization/depressurization determination block 534, where 1 indicates the determination of "pressurization", and 0 indicates the determination of "depressurization". In a section where the determination of "base neutral" is made, the final pressurization/depressurization determination is made in accordance with the determination made by the sub determination block 533. In the illustrated example, the determination of "base neutral" is made in the section where the magnitude relationship between the command hydraulic pressure (A) and the actual hydraulic pressure (B) repeats the inversion within the range of the predetermined minute value (causes the hunting phenomenon) in the course where the command hydraulic pressure (A) decreases, and at this time, such a long-time sub determination shows "sub lowering". Accordingly, it can be understood that a final depressurization determination is stably made without causing a reaction to the hunting phenomenon.

Returning to FIG. 3, in accordance with a command issued by the pressurization/depressurization determination block 534, the command torque-versus command hydraulic pressure conversion characteristic generation block 531 selects the pressurization characteristics (the torque rising-time curve 41a) or the depressurization characteristics (the torque dropping-time curve 41b) from the command torque-versus command hydraulic pressure conversion characteristics (the torque hysteresis characteristics) applied to the inputted command torque, and then in accordance with the selected pressurization characteristics (the torque rising-time curve 41a) or the selected depressurization characteristics (the torque dropping-time curve 41b), the command torque-versus command hydraulic pressure conversion characteristic generation block 531 generates and outputs a command hydraulic pressure corresponding to the inputted command torque. Note that, as the curve of the pressurization characteristics, which is used in the command torque-versus command hydraulic pressure conversion characteristic generation block 531, the torque rising-time curve 41a, which is basic, may be directly used; however, as the curve of the depressurization characteristics, the torque dropping-time curve 41b, which is basic, is not directly used, and such a curve is used, which is obtained by correcting the basic torque dropping-time curve 41b in response to a value of the actual hydraulic pressure at the time when the depressurization is started.

A correction example of the torque dropping-time curve 41b will be described with reference to FIG. 4. For example, when the depressurization is started (when the torque rising-time curve 41a is turned back) at a point P1 on the torque rising-time curve 41a, a correction coefficient is obtained based on an actual hydraulic pressure when the hydraulic control reaches the point P1, and a value of a command hydraulic pressure, which is obtained from the basic torque dropping-time curve 41b in response to the current command torque, is multiplied by the correction coefficient, whereby a command hydraulic pressure obtained after the correction is decided. In FIG. 4, a curve 41b1 shown by a broken line illustrates depressurization characteristics (a torque dropping-time curve) obtained by the above-mentioned correction when the depressurization is started at the point P1. Also when the depressurization is started (when the torque rising-time curve 41a is turned back) at a point P2 on the torque rising-time curve 41a, the command hydraulic pressure is corrected in a similar way to the above, whereby such depressurization characteristics (a torque dropping-time curve) 41b2 as shown by a broken line are obtained. Moreover, though reference symbols are omitted, in FIG. 4, some depressurization characteristics (torque dropping-time curves), which are obtained individually so as to correspond to some different depressurization starting points, are shown by broken lines.

The above is summarized as below. A combination of the command torque-versus command hydraulic pressure conversion characteristic generation block 531 and the pressurization/depressurization determination block 534 functions as a "characteristic decision unit". When the determination of the above-described "base raising" is made, this "characteristic determination unit" decides the above-described command hydraulic pressure by using the pressurization characteristics in the above-described torque hysteresis characteristics. When the determination of the above-described "base lowering" is made, the "characteristic determination unit" decides the above-described command hydraulic pressure by using the depressurization characteristics in the above-described torque hysteresis characteristics. When the determination of the above-described "base neutral" is made, the "characteristic determination unit" decides the above-described command hydraulic pressure by using the pressurization characteristics in the above-described torque hysteresis characteristics if the determination of the above-described "sub raising" is made, and the above-described command hydraulic pressure is determined by using the depressurization characteristics in the above-described torque hysteresis characteristics if the determination of the above-described "sub lowering" is made.

As mentioned above, in accordance with the present invention, as the basic control, which of the pressurization characteristics and the depressurization characteristics in the predetermined torque hysteresis characteristics is to be used is determined (selected) based on the magnitude relationship between the command hydraulic pressure and the actual hydraulic pressure. Accordingly, the selection of the pressurization characteristics and the depressurization characteristics, the selection accurately reflecting the actual pressurization or depressurization state in the hydraulic clutch, can be performed. As a result, the torque accuracy can be enhanced though such a simple configuration is adopted. Moreover, the determination of "base neutral" is made when the difference between the command hydraulic pressure and the actual hydraulic pressure is within the range of the predetermined minute value. Then, which of the pressurization characteristics and the depressurization characteristics in the torque hysteresis characteristics is to be used is determined (selected) not by the above-described selection that is based on the magnitude relationship between the command hydraulic pressure and the actual hydraulic pressure, but based on the long-time tendency of the change of the command torque, which is determined by the sub determination unit. Accordingly, the hysteresis curve selecting operation is caused not to respond to such a hunting phenomenon that the magnitude relationship between the command hydraulic pressure and the actual hydraulic pressure repeats the inversion within the minute value range. Therefore, also by this fact, the torque accuracy can be enhanced.

The invention claimed is:

1. A hydraulic control device for a vehicle, the hydraulic control device performing control to decide a command hydraulic pressure, which corresponds to command torque, based on predetermined torque hysteresis characteristics, the hydraulic control device comprising:
    a base determination unit that makes a determination of base neutral when a difference between the command hydraulic pressure and an actual hydraulic pressure of a hydraulic clutch is within a predetermined minute value range, and when the difference is out of the minute value range, makes a determination of base raising if the command hydraulic pressure is larger than the actual hydraulic pressure, and makes a determination of base lowering when the command hydraulic pressure is smaller than the actual hydraulic pressure;
    a sub determination unit that performs low-pass filter processing for the command torque, makes a determination of sub raising when an inclination of the command torque subjected to the low-pass filter processing is positive for a predetermined time or more, and makes a determination of sub lowering when the inclination is negative for the predetermined time or more;
    a characteristic decision unit that decides the command hydraulic pressure by using pressurization characteristics in the torque hysteresis characteristics when the determination of the base raising is made, decides the command hydraulic pressure by using depressurization characteristics in the torque hysteresis characteristics when the determination of the base lowering is made, and when the determination of the base neutral is made, decides the command hydraulic pressure by using the pressurization characteristics in the torque hysteresis characteristics if the sub determination unit makes the determination of the sub raising, and decides the command hydraulic pressure by using the depressurization characteristics in the torque hysteresis characteristics if the sub determination unit makes the determination of the sub lowering; and
    the hydraulic clutch that is supplied hydraulic oil to control a fastening force of the clutch, wherein a hydraulic pressure of the hydraulic oil is controlled based on the decided command hydraulic pressure to control the fastening force of the hydraulic clutch.

2. The hydraulic control device for the vehicle according to claim 1, wherein the vehicle includes: a driving force transmission path that transmits driving force, from a driving source to main drive wheels and sub drive wheels, the driving force being transmitted from the driving source to the sub drive wheels via a driving force distribution device composed of the hydraulic clutch disposed between the driving source and the sub drive wheels in the driving force transmission path, wherein the driving force distribution device controls the driving force that is transmitted from the driving source to the sub drive wheels based on the command hydraulic pressure.

3. A method for performing, in a hydraulic control device for a vehicle, control to decide a command hydraulic pressure, which corresponds to command torque, based on predetermined torque hysteresis characteristics, the method comprising:
    making a determination of base neutral when a difference between the command hydraulic pressure and an actual hydraulic pressure of a hydraulic clutch is within a predetermined minute value range, and when the difference is out of the minute value range, making a determination of base raising if the command hydraulic pressure is larger than the actual hydraulic pressure, and making a determination of base lowering when the command hydraulic pressure is smaller than the actual hydraulic pressure;
    performing low-pass filter processing for the command torque, making a determination of sub raising when an inclination of the command torque subjected to the low-pass filter processing is positive for a predetermined time or more, making a determination of sub lowering when the inclination is negative for the predetermined time or more;
    deciding the command hydraulic pressure by using pressurization characteristics in the torque hysteresis characteristics when the determination of the base raising is made, deciding the command hydraulic pressure by using depressurization characteristics in the torque hysteresis characteristics when the determination of the base lowering is made, and when the determination of the base neutral is made, deciding the command hydraulic pressure by using the pressurization characteristics in the torque hysteresis characteristics if the determination of the sub raising is made, and deciding the command hydraulic pressure by using the depressurization characteristics in the torque hysteresis characteristics if the determination of the sub lowering is made; and
    controlling a hydraulic pressure of hydraulic oil that is supplied to the hydraulic clutch based on the decided command hydraulic pressure to control a fastening force of the hydraulic clutch.

* * * * *